Oct. 10, 1950     P. P. ANDERSON, JR     2,525,011
ABSORPTION REFRIGERATION
Filed March 14, 1947
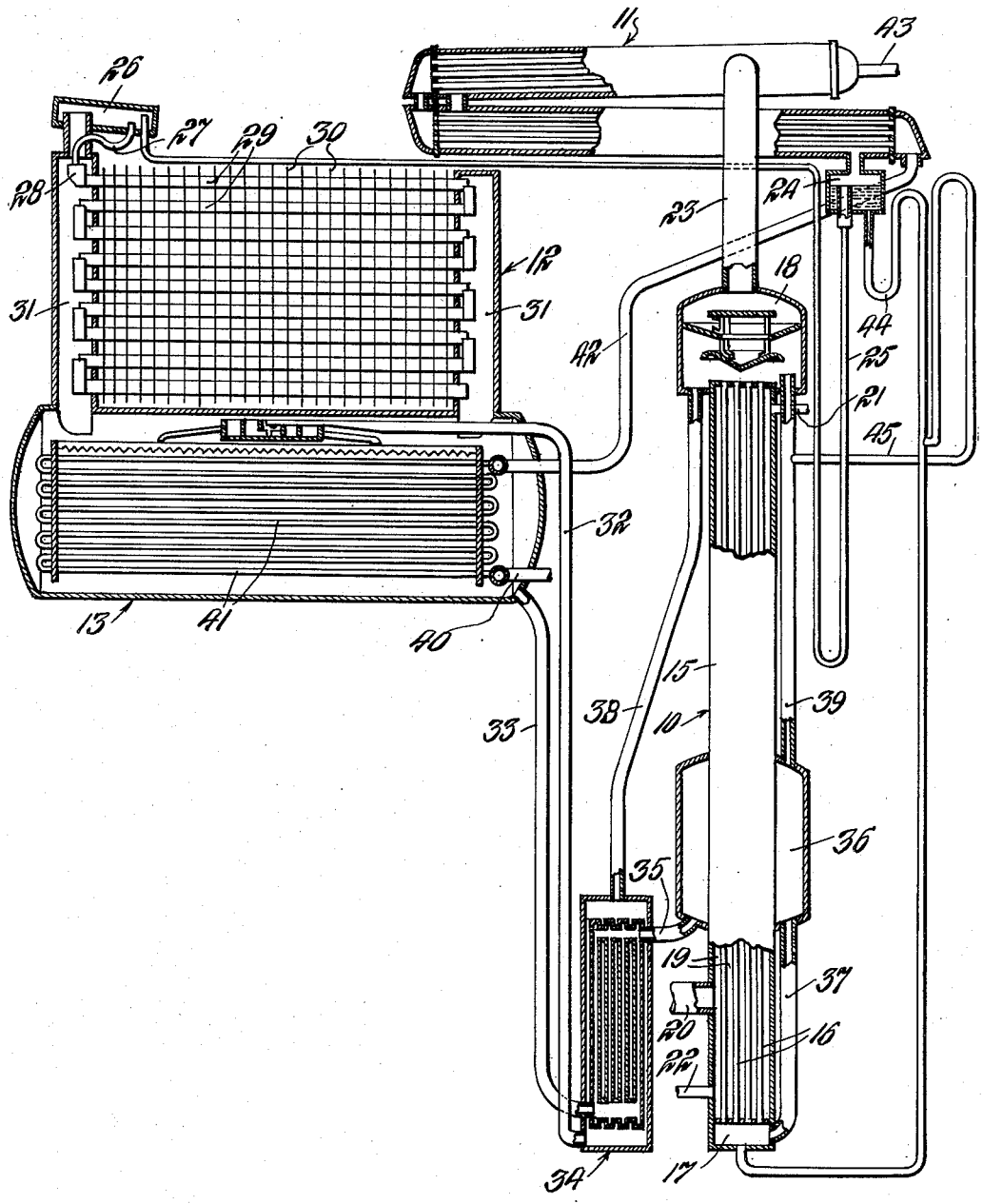
INVENTOR.
BY Philip P. Anderson, Jr.
ATTORNEY Patented Oct. 10, 1950

2,525,011

UNITED STATES PATENT OFFICE 2,525,011

ABSORPTION REFRIGERATION

Philip P. Anderson, Jr., Evansville, Ind., assignor to Servel, Inc., New York, N. Y., a corporation of Delaware Application March 14, 1947, Serial No. 734,668

9 Claims. (Cl. 62—119)

This invention relates to refrigeration and particularly to means for reducing superheat in the generator of an absorption refrigerating apparatus.

In absorption refrigerating apparatus of the vacuum or low pressure type, for example, it has been found that the refrigerant-absorbent solution in the generator may be heated beyond its boiling point without its boiling. In other words, the solution is often superheated. This superheating of the solution occurs particularly at the start of a cooling cycle. Superheating of the solution not only affects the efficiency of the unit adversely, it causes a nuisance in the form of crackling noises.

It has been found in practice that if the refrigerant-absorbent solution in the generator be diluted with liquid refrigerant, such diluted solution boils more readily and without appreciable superheat. Operating the generator continuously with diluted solution, however, reduces the efficiency of the unit.

It is therefore an object of this invention to provide an improved means to insure dilution of the solution in the generator of an absorption refrigerating unit at the beginning, and only at the beginning, of a cooling cycle, regardless of operating conditions immediately prior to a previous shutdown.

I accomplish this by providing a reservoir or storage chamber for liquid refrigerant, water in this case, which reservoir is filled with liquid refrigerant directly from the condenser each time the unit is started up, and which stored refrigerant is dumped into the bottom of the generator each time the unit shuts down. The dumping is accomplished by means of a siphon, which siphon is prevented from dumping during cooling cycles of operation of the unit by imposing a greater pressure on the down leg of the siphon than that imposed on the up leg thereof. In this manner it is assured that the solution in the generator will be dilute when, and only when, the unit is shut down and for a short period of time after it is started up.

The invention, together with the above and other objects and advantages, will be better understood from the following detail description taken in connection with the accompanying drawing, wherein the single figure diagrammatically illustrates a refrigerating apparatus embodying my invention.

Referring to the drawing, the apparatus shown comprises basically a two-pressure water absorption type refrigerating unit generally as described in United States patent to A. R. Thomas and P. P. Anderson, Jr., No. 2,282,503, granted May 12, 1942. An apparatus of this type operates below atmospheric pressure and includes a generator 10, a condenser 11, an evaporator 12 and an absorber 13, which are interconnected in such a manner that flow of fluids between the high and low pressure sides of the apparatus is regulated by liquid columns.

The generator 10 includes an outer shell 15 within which are disposed a plurality of vertical riser tubes 16 having the lower ends thereof communicating with an inlet chamber 17 and the upper ends thereof projecting into and above the bottom of a separating vessel 18. A space 19 within shell 15 and about the tubes 16 forms a steam chamber to which steam is supplied through a conduit 20 from any suitable source. The space 19 provides for full length heating of tubes 16, a vent conduit 21 being provided at the upper end of shell 15. The condensate formed in the steam chamber of generator 10 flows therefrom through a conduit 22.

The unit contains a water solution of refrigerant in absorbent liquid such as, for example, a water solution of lithium chloride, lithium bromide or a mixture of the two. With steam supplied through conduit 20 to space 19, heat is applied to tubes 16 whereby water vapor is expelled from solution. The residue absorption solution is raised by gas or vapor-lift action with the expelled water vapor forming a small core within an upwardly rising annulus of the solution. The expelled water vapor rises more rapidly than the solution with the solution flowing along the inside walls of the tubes 16.

The water vapor flows upwardly through the tubes or risers 16 into vessel 18 which serves as a vapor separator. Due to baffling in vessel 18, water vapor is separated from raised absorption solution and flows through a conduit 23 into condenser 11 wherein the vapor is liquefied. The liquid refrigerant formed in condenser 11 flows therefrom into a reservoir 24, to be referred to in more detail hereinafter, and from the reservoir the liquid refrigerant flows through a U-tube or trap 25 into a flash chamber 26. From the flash chamber, the liquid refrigerant flows through a conduit 27 into a distributing trough 28 and from there into the upper row of tubes 29 of the evaporator 12. The liquid refrigerant flows through the several rows of tubes 29 in series wherein it is vaporized with consequent absorption of heat to product the desired refrigerating effect which is utilized, in this instance, to cool an air stream flowing over the tubes 29. Tubes 29 are provided with heat transfer fins 30.

The refrigerant vapor formed in the evaporator tubes flows into headers 31 at each end of the evaporator, and from there the vapor flows to the absorber 13, in which the vapor is absorbed by absorption solution which enters the upper part of the absorber through a conduit 32. The absorption solution enriched in refrigerant is conducted from the absorber through a conduit 33, an inner passage in a liquid heat exchanger 34, a conduit 35, a stabilizing vessel 36, and a conduit 37 into the inlet chamber 17 of generator 10. Refrigerant vapor is expelled out of solution in generator 10 by heating, and the solution is raised by gas or vapor-lift action in riser tubes 16, as explained above.

The absorption solution weak in refrigerant which has been lifted in the riser tubes into vessel 18 flows therefrom through a conduit 38, an outer passage in liquid heat exchanger 34, and conduit 32 into the upper part of absorber 13. This circulation of absorption solution results from the raising of solution in riser tubes 16, whereby such solution can flow to the absorber and return from the latter to the generator by force of gravity. The upper part of vessel 36 and the lower part of vessel 18 are connected by a vent conduit 39.

The absorber 13 and condenser 11 constitute heat rejecting parts of the refrigeration apparatus and are cooled by a suitable cooling medium such as water, for example, which is conducted from a suitable source of supply through a conduit 40 to a bank of tubes 41 within the absorber, whereby heat of absorption is given up to the cooling water. The cooling water is conducted from the absorber through a conduit 42 to condenser 11 in which heat of condensation is given up to the cooling water. The cooling water leaves the condenser through a conduit 43.

In accordance with this invention, a reservoir 24, referred to above, is provided at the outlet end of the condenser to receive liquid refrigerant therefrom. As shown, U-tube 25 projects upwardly within the reservoir in such a manner that the reservoir is substantially filled with liquid refrigerant from the condenser before such refrigerant overflows into U-tube 25. A siphon tube 44 leads from the bottom of reservoir 24 and has its opposite or outlet end connected to the inlet chamber 17 of the generator for flow of liquid refrigerant from the reservoir to the generator. Siphon 44 is prevented from draining the reservoir during cooling cycles of operation by providing a connection, such as conduit 45, between the down leg of the siphon tube and the upper part of the generator. As shown, conduit 45 is in the form of a loop that leads from the upper part of vent conduit 39 to the down leg of siphon 44.

In operation, when the unit is started up on a cooling cycle, refrigerant vapor is expelled from solution in the generator, which vapor is liquefied in the condenser and flows into reservoir 24 to the point of overthrow into trap 25, after which the liquid refrigerant flows through trap 25 to the flash chamber and from there into the evaporator, wherein the liquid refrigerant is vaporized, producing the desired refrigerating effect, as explained above. As long as refrigerant vapor is being expelled from solution in the generator, the pressure in the down leg of siphon 44 is greater than the pressure on the top of the liquid refrigerant in reservoir 24 so that the siphon is prevented from draining the reservoir during cooling cycles. This pressure difference is due partly to a pressure drop in the condenser and partly to a pressure drop in the vapor line between the generator and condenser. However, when the unit is shut down, that is, when refrigerant vapor ceases to be expelled from solution, the pressures above the refrigerant in storage vessel 24 and in the down leg of siphon 44 are equalized so that the siphon drains the liquid refrigerant from the reservoir, which refrigerant flows to the inlet chamber 17 of the generator, thereby diluting the solution in the generator each time the unit shuts down. In this manner, it is insured that the generator always contains diluted absorption solution following each shutdown, regardless of operating conditions, so that when the unit is again started up the solution boils readily in the generator without superheating. Also, as pointed out above, the liquid refrigerant which is utilized to dilute the solution at the end of each cooling cycle of operation is stored in reservoir 24 at the beginning of each cooling cycle, so that the solution in the generator is dilute only during shutdown periods and at the beginning of cooling cycles.

Having thus described my invention, I wish it to be understood that I do not desire to be limited to the particular structure illustrated and described, for obvious modifications may occur to a person skilled in the art.

What is claimed is:

1. A heat-operated refrigerating apparatus comprising a plurality of parts including a generator, a condenser and conduits interconnecting said elements for flow of refrigerating fluid therethrough, means for applying heat to said generator, whereby refrigerant vapor is expelled therefrom, which vapor is liquefied in the condenser, means for accumulating and storing liquid refrigerant, means operable responsive to a pressure difference between a vapor space of the generator and condenser for holding liquid refrigerant in storage so long as heat is appled to the generator, said last-named means including means operable responsive to an equalization of pressure in a vapor space of the generator and condenser for dumping the stored liquid refrigerant into the generator immediately following the cessation of the application of heat thereto.

2. An absorption refrigerating apparatus including a generator, a condenser, an evaporator, an absorber and conduits interconecting said elements for flow of a refrigerating medium and an absorption solution, a reservoir connected to said condenser to receive liquid refrigerant therefrom, and means operable responsive to an equalization of pressure in a vapor space of the generator and condenser following each shutdown of the apparatus for dumping the contents of said reservoir into a lower portion of the generator each time the apparatus shuts down.

3. An absorption refrigerating apparatus including a generator, a condenser, an evaporator, an absorber and conduits interconnecting said elements for flow of a refrigerating medium and an absorption solution, a reservoir immediately adjacent the outlet of the condenser for receiving liquid refrigerant therefrom, a conduit connected directly between the reservoir and the bottom of the generator for flow of liquid refrigerant from the former to the latter, means in said conduit operable responsive to a pressure difference between a vapor space of the generator and condenser for blocking the flow of liquid refrigerant therethrough during cooling cycles of operation, and additional means in said conduit operable responsive to an equalization of pressure in a vapor space of the generator and condenser for causing flow of liquid refrigerant through said conduit following each shutdown of the apparatus.

4. A two-pressure absorption refrigeration system having a generator, a liquefier, an evaporator, an absorber, conduits interconnecting said elements to provide paths of flow for refrigerant and absorbent and including a reservoir for accumulating and storing liquid refrigerant during operation of the system and connected by means including a siphon to deliver the accumulated refrigerant to the generator after the completion of a period of operation to promote boiling at the beginning of the next period of operation, and means operable upon equalization of pressures after operating periods of the system for initiating operation of said siphon.

5. An absorption refrigerating apparatus including a generator, a condenser, an evaporator, an absorber and conduits interconnecting said elements for flow of a refrigerating medium and an absorption solution, a reservoir immediately adjacent the outlet of the condenser for receiving liquid refrigerant therefrom, a siphon tube connected between the bottom of the reservoir and the bottom of the generator for flow of liquid refrigerant from the former to the latter, and means connecting a down leg of said siphon tube with a vapor space of said generator for blocking flow of liquid refrigerant through the siphon tube so long as refrigerant vapor is being expelled from the generator.

6. An absorption refrigerating apparatus including a generator, a condenser, an evaporator, an absorber and conduits interconnecting said elements for flow of a refrigerating medium and an absorption solution, a by-pass connection between the condenser and the generator for flow of liquid refrigerant from the former to the latter, means in said by-pass for accumulating and storing liquid refrigerant each time the apparatus is started up, and a vent conduit connected between a vapor space of the generator and the by-pass for balancing pressures therebetween, the construction and arrangement of said by-pass and said vent conduit being such that, so long as refrigerant vapor is expelled from solution in the generator, liquid refrigerant is held in storage in the by-pass, whereas, each time the apparatus is shut down and refrigerant vapor is no longer expelled from solution in the generator, the stored liquid refrigerant is dumped through the by-pass into the generator.

7. An absorption refrigerating apparatus including a generator, a condenser, an evaporator, an absorber and conduits interconnecting said elements for flow of a refrigerating medium and an absorption solution, a by-pass connection between the condenser and the generator for flow of liquid refrigerant from the former to the latter, said by-pass including a reservoir for accumulating and storing liquid refrigerant each time the apparatus is started up and a siphon tube for emptying the reservoir each time the apparatus is shut down, and a vent conduit connected between a vapor space of the generator and a down leg of the siphon tube, the construction and arrangement of said by-pass and said vent conduit being such that, so long as refrigerant vapor is expelled from solution in the generator, liquid refrigerant is held in storage in the reservoir, whereas, each time the apparatus is shut down and refrigerant vapor is no longer expelled from the solution in the generator, the stored liquid refrigerant is dumped from the reservoir through the siphon tube into the generator.

8. An absorption refrigerating apparatus including a generator, a condenser, an evaporator, an absorber and conduits interconnecting said elements for flow of a refrigerating medium and an absorption solution, means for applying heat to the generator whereby refrigerant vapor is expelled from refrigerant-absorbent solution therein, which vapor flows into the condenser wherein the vapor is liquefied, a reservoir in the conduit between the condenser and evaporator, means in the reservoir for accumulating and storing the first liquid refrigerant that flows from the condenser following the application of heat to the generator and for thereafter flowing liquid refrigerant through said last-named conduit into the evaporator, a siphon tube connected between the reservoir and the generator for flow of liquid refrigerant from the former to the latter, and a vent conduit connected between a vapor space of the generator and a down leg of the siphon tube for balancing pressures therebetween, the construction and arrangement of the reservoir, siphon tube and vent conduit being such that, so long as refrigerant vapor is expelled from the solution in the generator, liquid refrigerant is held in storage in the reservoir, whereas, each time the apparatus is shut down and refrigerant vapor is no longer expelled from solution in the generator, the stored liquid refrigerant is dumped through the siphon tube into the generator, thereby diluting the refrigerant-absorbent solution contained therein.

9. In the art of refrigeration through the agency of a two-pressure absorption refrigerating system including a generator, a condenser, an evaporator, an absorber and conduits interconnecting said elements for flow of a refrigerating medium and an absorption solution, that improvement which comprises accumulating liquid refrigerant in a place of storage each time the system is started up, holding a quantity of liquid refrigerant in the place of storage responsive to a pressure difference between the generator and the condenser due to the expulsion of refrigerant vapor from solution in the generator, and dumping the stored liquid refrigerant from the place of storage into the generator responsive to an equalization of pressure in the generator and condenser each time the system is shut down.

PHILIP P. ANDERSON, Jr.

REFERENCES CITED

The following references are of record in the file of this patent:

UNITED STATES PATENTS

| Number | Name | Date |
| --- | --- | --- |
| 1,506,530 | Kasley | Aug. 26, 1924 |
| 2,223,752 | Ullstrand | Dec. 3, 1940 |
| 2,345,454 | Brace | Mar. 28, 1944 |
| 2,377,926 | Dreier | June 12, 1945 |
| 2,399,922 | Grossman | May 7, 1946 |
| 2,426,069 | Thomas | Aug. 19, 1947 |
| 2,465,939 | Skomp | Mar. 29, 1949 |